United States Patent [19]

Ikuma

[11] Patent Number: 4,713,429
[45] Date of Patent: Dec. 15, 1987

[54] METHOD FOR PRODUCTION OF COPOLYMER OF VINYL CYANIDE COMPOUND AND AROMATIC VINYL COMPOUND

[75] Inventor: Sadao Ikuma, Suzuka, Japan

[73] Assignee: Mitsubishi Monsanto Chemical Company, Tokyo, Japan

[21] Appl. No.: 879,393

[22] Filed: Jun. 27, 1986

[30] Foreign Application Priority Data

Jun. 28, 1985 [JP] Japan .................. 60-141969

[51] Int. Cl.$^4$ ............ C08F 2/18; C08F 4/04; C08F 212/10
[52] U.S. Cl. ........................ 526/87; 526/88; 526/80; 526/218.1; 526/219.1; 526/342; 526/347
[58] Field of Search .............. 526/88, 342, 87, 218.1, 526/347, 80, 219.1; 523/307

[56] References Cited

U.S. PATENT DOCUMENTS

| | | | |
|---|---|---|---|
| 3,293,233 | 12/1966 | Erchak, Jr. et al. | 526/86 X |
| 3,701,761 | 10/1972 | Ashina et al. | 526/342 |
| 3,817,965 | 6/1974 | Mace et al. | 526/342 |
| 3,931,128 | 1/1976 | Takizawa et al. | 526/342 X |
| 3,963,687 | 6/1976 | Saxton | 526/342 X |
| 4,088,811 | 5/1978 | Harris et al. | 526/342 X |
| 4,125,695 | 11/1978 | Kamath | 526/342 X |
| 4,536,556 | 8/1985 | Tijssen et al. | 526/342 |

*Primary Examiner*—Joseph L. Schofer
*Assistant Examiner*—F. M. Teskin
*Attorney, Agent, or Firm*—Oblon, Fisher, Spivak, McClelland, & Maier

[57] ABSTRACT

A method for producing by suspension polymerization a copolymer comprising a vinyl cyanide compound and an aromatic vinyl compound having excellent transparency, and uniform composition, and a content of the polymerized residue of vinyl cyanide compound in the range of from 50 to 85% by weight comprising the steps of: (a) carrying out initial charging of the total quantity of the vinyl cyanide compound and a partial quantity of the aromatic vinyl compound at a compositional ratio, wherein the content of the vinyl cyanide compound in the resulting copolymer attains an intended ratio within a range of from 50 to 85% by weight; (b) initiating the copolymerization reaction by adding a polymerization initiator having a decomposition half-life at 95° C. of two hours or longer to the compounds charged in previous step after the reaction system is elevated to a temperature corresponding to a decomposition half-life T of the polymerization initiator and (c) carrying out the copolymerization reaction, elevating temperature of the reaction system along a temperature corresponding to the decomposition half-life of the polymerization initiator, while immediately and continuously feeding the remainder of the aromatic vinyl compound to the reaction system.

2 Claims, 2 Drawing Figures

Ⓐ 1-t-BUTYL-AZO-1-CYANO-CYCLOHEXANE

Ⓑ 1,1'-AZO-BIS-CYCLOHEXANE-CARBONITRILE

Ⓒ 2-t-BUTYL-AZO-1-CYANOBUTANE

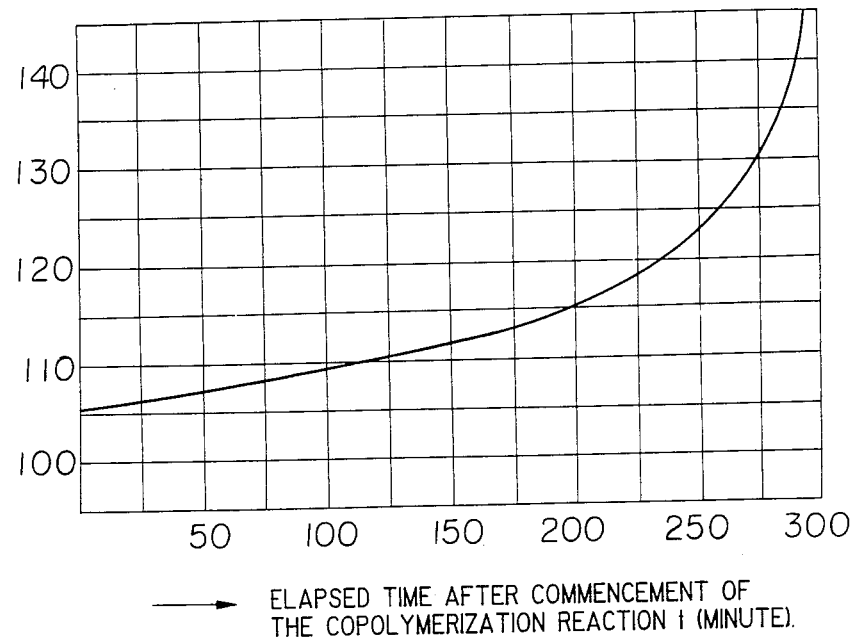

METHOD FOR PRODUCTION OF COPOLYMER OF VINYL CYANIDE COMPOUND AND AROMATIC VINYL COMPOUND

BACKGROUND OF THE INVENTION

1. Field of the Invention

This invention relates to a method for production of a copolymer of vinyl cyanide compound and aromatic vinyl compound. More particularly, it is concerned with an industrially advantageous method for producing a copolymer of vinyl cyanide compound and aromatic vinyl compound by the suspension polymerization with water as the dispersion medium, the copolymer having high content of vinyl cyanide compound, being uniform in its composition, and having excellent transparency, gas barrier property, and chemical resistant property.

2. Description of the Prior Art

The copolymer of vinyl cyanide compound and aromatic vinyl compound having a uniform composition is excellent in its transparency, heat stability and mechanical properties; in particular, when the copolymer contains therein the vinyl cyanide compound at a high ratio, it exhibits extremely superior characteristics in its gas barrier property and chemical resistant property, in addition to the above-mentioned properties, hence there has been expected development of an industrially advantageous method for producing the copolymer of vinyl cyanide compound and aromatic vinyl compound having a uniform composition and a high content of the vinyl cyanide compound.

As has been well known, the composition of the copolymer to be produced depends on the compositional ratio and reactivity ratio of the monomers to be used in the reaction system. Accordingly, when the copolymerization reaction is caused to proceed from the reaction system of a certain monomer compositional ratio, the compositional ratio of the unreacted monomer and the composition of the copolymer to be produced from it varies with advancement in the copolymerization reaction, except for a case wherein the monomer compositional ratio is of an azeotropic composition. In the case of producing a copolymer of acrylonitrile and styrene, which is one example of the copolymer of vinyl cyanide compound and aromatic vinyl compound, by the suspension polymerization method, when the compositional ratio of acrylonitrile and styrene at their initial charging is set at more than 24% by weight (the azeotropic composition) of acrylonitrile (e.g. 96% by weight), there is obtained the copolymer at the initial stage of the copolymerization reaction with the acrylonitrile content of 65% by weight. However, from the relationship in the reactivity ratio of the monomers, a ratio of the unreacted styrene with respect to the unreacted acrylonitrile gradually decreases with advancement of the copolymerization reaction. As the consequence of this, the copolymer to be produced at the last stage of the copolymerization reaction would inevitably have a high content of acrylonitrile, hence the compositional distribution of the copolymer to be resulted from a series of the copolymerization reaction becomes very broad. In addition, since a copolymer having such broad compositional distribution has poor compatibility among the constituent elements with the result that its transparency becomes inferior with accompaniment of other disadvantages to be derived from non-uniformity in the constituent elements.

From the above-mentioned background, in order to produce the copolymer having a uniform composition as intended and excellent quality, it is important that the compositional ratio of the monomer compound as at the start of the copolymerization reaction be maintained until termination of the reaction by first carrying out the initial charging of the constituent elements at a monomer compositional ratio adapted to the reactivity ratio of the monomers, followed by initiation of the copolymerization reaction, and thereafter, as the copolymerization reaction proceeds, supplementing the monomer compound of quick consumption into the reaction system.

In the suspension polymerization method, there have so far been proposed several methods for producing the copolymer of vinyl cyanide compound and aromatic vinyl compound of a relatively high content of the vinyl cyanide compound by additional feeding of the aromatic vinyl compound into the reaction system.

For instance, Japanese Examined Patent Publication No. 36315/1976 (Counter Part: U.S. Pat. No. 4,039,734) discloses a method, in which the aromatic vinyl compound is supplied in accordance with the amount of heat found from detection of the reaction heat during the copolymerization reaction. This method, however, has disadvantages such that the operations for the copolymerization reaction are extremely complicated, and others, because errors in measurement of the reaction heat is great, the copolymer of non-uniform composition is prone to be readily yielded, and, moreover, the feeding quantity of the aromatic vinyl compound varies at every hour.

Further, U.S. Pat. specification No. 4,088,811 discloses a method, in which the copolymerization reaction is conducted at a relatively low temperature of from 70° C. to 90° C. by use of a polymerization initiator such as azobisisobutyronitrile, etc., while continuously supplementing the aromatic vinyl compound. However, this method has also disadvantages such that, depending on the polymerization apparatus to be used, it is difficult to maintain the reaction system at a temperature ranging from 70° C. to 90° C. against the heat of reaction, for which a special heat-removing method has to be adopted; and, in the stripping step for the residual monomer subsequent to the polymerization step, the temperature is usually elevated to a range of from 130° C. to 150° C., which might take a long time until it attains the required stripping temperature, when the polymerization temperature is low, in other words, a waiting time for the elevated temperature becomes prolonged to result in reduced production efficiency; and so forth.

Besides the above-mentioned methods, there have been proposed various methods such as, for example, one, in which the copolymerization is conducted by stepwise setting of the reaction temperature for every conversion (Japanese Examined Patent Publication No. 27808/1971); one, in which the bulk polymerization and the suspension polymerization are combined (Japanese Examined Patent Publication No. 37836/1974); one, in which a plurality of particular polymerization initiators are combined and the temperature is elevated stepwise (Japanese Examined Patent Publication No. 33917/1975), and others. All these methods, however, can hardly be said to be satisfactory as the methods for producing, with industrial advantage, the copolymer of vinyl cyanide compound and aromatic vinyl compound having a uniform composition and a high content of vinyl cyanide compound.

SUMMARY OF THE INVENTION

The present inventor, therefore, made strenuous efforts in finding out the method for producing, in industrial scale, the copolymer of vinyl cyanide compound and aromatic vinyl compound having a uniform composition and a high content ratio of vinyl cyanide compound. As the result of such continued efforts in the studies and researches, I discovered that the copolymer capable of eliminating the above-mentioned disadvantages in the conventional technique and having the intended uniform composition can be produced easily and stably by first providing an initial reaction system having a compositional ratio of monomers adapted to the monomer reactivity ratio, and then carrying out the copolymerization reaction with a particular pattern for temperature elevation and in the presence of a polymerization initiator, while continuously feeding the aromatic vinyl compound into the reaction system. Based on such finding, I completed the present invention.

The gist of the present invention resides in a method for production by the suspension polymerization of a copolymer of vinyl cyanide compound and aromatic vinyl compound having a substantially uniform composition and a content ratio of the vinyl cyanide compound ranging from 50 to 85% by weight, said method being characterized by comprising: a first step of carrying out initial charging of the total quantity of said vinyl cyanide compound and a partial quantity of said aromatic vinyl compound at a compositional ratio, wherein the content of the vinyl cyanide compound in the resulting copolymer attains an intended ratio within a range of from 50 to 85% by weight; a second step of initiating the copolymerization reaction by addition of a polymerization initiator to said initially charged reaction system, after said reaction system is elevated to a temperature corresponding to a decomposition half-life T of the polymerization initiator to be represented by the following equation (I) and calculated as t=0, and to be found from a decomposition half-life versus temperature diagram as shown in FIG. 1 of the accompanying drawing:

$$T = \frac{\log 2}{\log\left(\frac{t_0 - t}{t_0 - t - 1}\right)} \quad (I)$$

where: t denotes an elapsed time (in minute) after initiation of the copolymerization reaction as counted from the instant, at which the polymerization initiator is added to the reaction system and continuous feeding of the aromatic vinyl compound is commenced, as the starting point; $t_0$ represents an arbitrary time (in minute) which is longer by two minutes or more than the time for the continuous feeding of the aromatic vinyl compound; and T is the decomposition half-life (in minute) of the polymerization initiator to be used; and a third step of carrying out the copolymerization reaction, while immediately and continuously feeding remainder of the aromatic vinyl compound to the reaction system after commencement of the copolymerization reaction, and elevating the temperature of the reaction system along a temperature ($\theta$) corresponding to the decomposition half-life T of the polymerization initiator to be represented by the said equation (I) and to be found from the decomposition half-life versus temperature diagram as shown in FIG. 1.

BRIEF DESCRIPTION OF THE DRAWING

In the following, the present invention will be explained in detail in reference to the accompanying drawing.

In the drawing:

FIG. 2 is also a graphical representation schematically showing a temperature curve for the copolymerization reaction, in which the abscissa denotes an elapsed time (in minute) after commencement of the copolymerization reaction and the ordinate represents the temperature for the copolymerization reaction to be correspondent to the elapsed time.

DETAILED DESCRIPTION OF THE INVENTION

Figure 1:
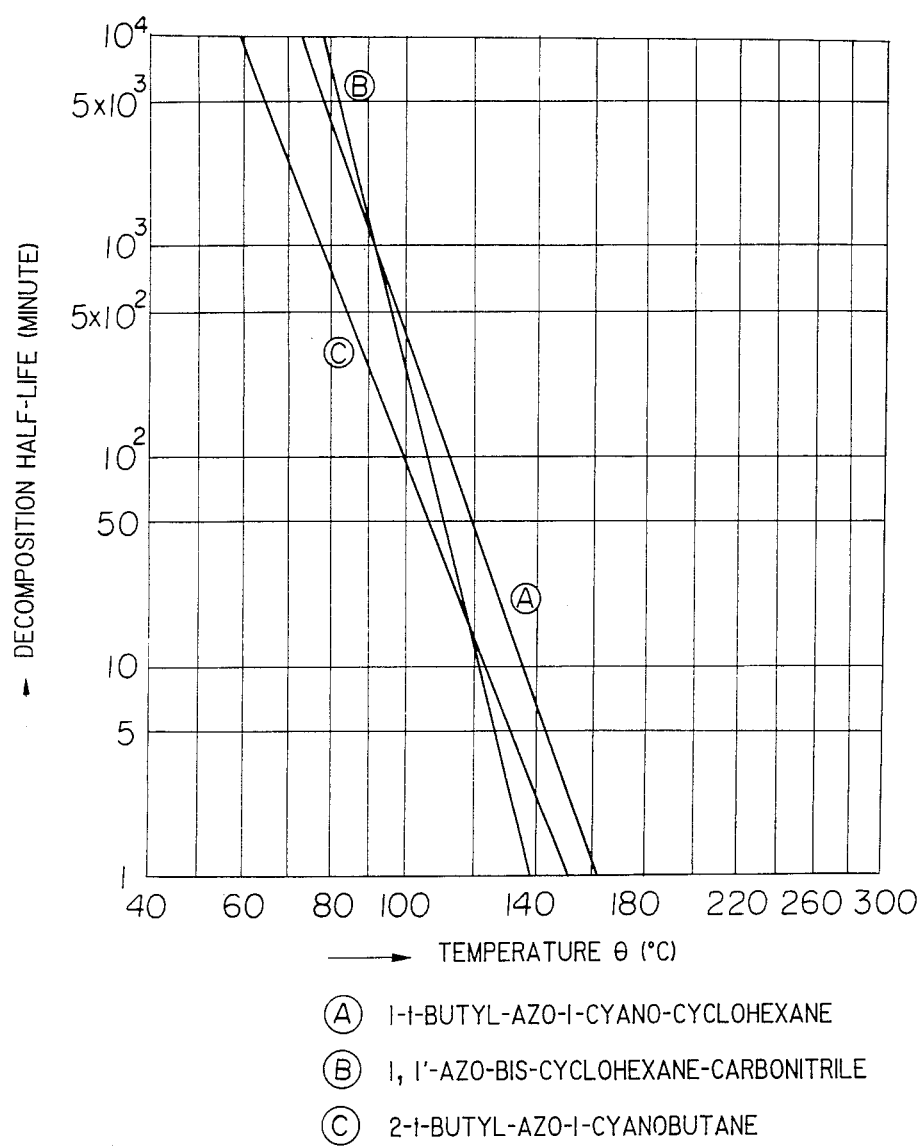
FIG. 1 is a graphical representation showing a relationship between the decomposition half-life of the polymerization initiator and a reaction temperature, in which the abscissa represents temperature and the ordinate denotes decomposition half-life, thereby illustrating examples of the polymerization initiator useful for the purpose of the present invention.

In the present invention, the vinyl cyanide compound designates acrylonitrile, methacrylonitrile, or a mixture of these. Also, the aromatic vinyl compound designates styrene, α-methylstyrene, paramethylstyrene, t-butyl styrene, styrene halide, or mixtures of any of these compounds. Besides these two kinds of monomeric compounds as the starting material, there may be added to the reaction system, either before or during the copolymerization reaction, a small quantity of a monomer such as acrylic acid ester, methacrylic acid ester or maleimide; a rubber component such as polybutadiene, acrylonitrile-butadiene copolymer or polyacrylic acid ester; an antioxidant such as di-t-butyl paracresol; and a processability improving agent such as butyl stearate, as a third component, for the purpose of improvement in properties of the resulting copolymer.

According to the method of the present invention, the content of the vinyl cyanide compound in the resulting copolymer is set at a range of from 50 to 85% by weight. The reason for this is that, when the content of the vinyl cyanide compound in the copolymer is below 50% by weight, the gas barrier property and the chemical resistant property of the copolymer are not satisfactory with the consequent inability to attain the purpose of the present invention; on the other hand, when the content of the vinyl cyanide compound exceeds 85% by weight, the processing property and heat stability of the copolymer at the time of the processing and/or molding process become so inferior that the resin is practically unusable.

In the first step of the production method according to the present invention, it is necessary that the total amount of the vinyl cyanide compound and a partial amount of the aromatic vinyl compound be initially charged into an aqueous medium at a compositional ratio, in which the content of the vinyl cyanide compound in the resulting copolymer attains an intended ratio within a range of from 50 to 85% by weight.

A ratio, at which the vinyl cyanide compound to be present in the resulting copolymer attains an intended content, i.e., the compositional ratio of the monomeric compounds at the initial charging may be determined on the basis of a monomer reactivity ratio as described in detail in the Young's Table (vide: "Polymer Handbook", 2nd Edition, published by John Wiley, New York, 1975), and others, or on the basis of experimental results on the copolymerization reaction to be conducted.

For instance, in the production of acrylonitrile/styrene copolymer, when it is desired to obtain the copolymer with the acrylonitrile content of 50% by weight, the initial charging of the monomeric compounds may be carried out at the compositional ratio of 89 parts by weight of acrylonitrile and 11 parts by weight of styrene; also, when it is desired to obtain the copolymer with the acrylonitrile content of 85% by weight, the initial charging of the monomeric compounds may be carried out at the compositional ratio of 99 parts by weight of acrylonitrile and 1 part by weight of styrene.

In the subsequent second step, since it is advantageous to carry out the copolymerization reaction, from that time onwards, in the absence of oxygen, the reaction system at the initial charging in the above-mentioned first step is substituted with an inert gas such as nitrogen, etc.; thereafter, it is elevated to a polymerization initiating temperature which corresponds to the decomposition half-life T of the polymerization initiator to be represented by the above-mentioned equation (I) and to be calculated as $t=0$, and which can be found from the decomposition half-life versus temperature diagram as exemplified in FIG. 1, after which the polymerization is initiated by adding the polymerization initiator to this reaction system.

In the following, an exemplary method of finding out the polymerization initiating temperature will be explained. That is to say, since, according to the present invention, the continuous feeding of the aromatic vinyl compound should preferably be terminated in two to eight hours, if $t_0$ is set at 300 (minutes), the decomposition half-life T of the polymerization initiator to be used becomes 207.6 minutes. On the other hand, when the polymerization initiator is 1-t-butyl-azo-1-cyano-cyclohexane, the temperature corresponding to this decomposition half-life is found to be 106° C. from a rectilinear line Ⓐ of the decomposition half-life versus temperature diagram in FIG. 1, which stands for the copolymerization initiating temperature in this case.

As the polymerization initiator to be used for the method of the present invention, those azo-type polymerization initiators having their decomposition half-life at 95° C. of two hours or longer are suitable from the standpoint of the operations for the copolymerization reaction as well as the quality of the copolymer to be obtained. Examples of the polymerization initiators to satisfy the above-mentioned conditions are: 1-t-butyl-azo-1-cyano-cyclohexane, 1,1'-azo-bis-cyclohexane-carbonitrile, 2-t-butyl-azo-1-cyanobutane, and others, the relationship between the decomposition half-life and the temperature of these compounds being as shown in FIG. 1. When the decomposition half-life at 95° C. of the polymerization initiator is shorter than two hours, the temperature for the copolymerization reaction becomes low and the heat removing efficiency of the reaction heat decreases with the consequence that the reaction control becomes unfavorably difficult. On the other hand, when the organic peroxide type polymerization initiator is used, no satisfactory hue and transparency can be obtained with the resulting copolymer, which is not preferable.

The polymerization initiator should preferably be added to the reaction system in lump. The adding quantity of such polymerization initiator, though it is governed by a period for the continuous feeding of the aromatic vinyl compound at the third step, the polymerization initiating temperature, the compositional ratio of the monomeric compounds, and so on, is generally in a range of from 0.05 to 0.5 part by weight relative to 100 parts by weight of the total monomeric compounds as charged at both initial charging step and additional feeding, or more preferably in a range of from 0.1 to 0.5 part by weight, which is more practical.

In the third and last step of the method according to the present invention, the copolymerization reaction is caused to proceed, while immediately and continuously feeding remainder of the aromatic vinyl compound into the reaction system after commencement of the polymerization, and elevating the temperature of the reaction system along a temperature which corresponds to the decomposition half-life T of the polymerization initiator to be represented by the above-mentioned equation (I), and which can be found from the decomposition half-life versus temperature diagram as exemplified in FIG. 1. In this case, the continuous feeding speed of the aromatic vinyl compound should preferably be constant, and the time period for such feeding is generally in a range of from two to eight hours. When the continuous feeding time of the aromatic vinyl compound is shorter than two hours, removal of the reaction heat becomes difficult; on the contrary, when the feeding time period exceeds eight hours, the productivity of the copolymer becomes poor, all of which are not favorable for the purpose of the present invention.

The total quantity of the aromatic vinyl compound to be continuously fed at the third step may vary to some extent depending on the polymerization initiators to be used, and the time period for the continuous feeding. Such total quantity may be determined from the results of experiments carried out with a quantity calculated from an empirical formula as represented by the following equation II as a reference:

$$Wsa = \frac{\eta(1 - Xan)}{1 - \eta(1 - Xan)} Wan - Wsi \quad (II)$$

where: Wsa denotes the total quantity (kg) of the aromatic vinyl compound to be continuously fed at the third step; Wan and Wsi respectively indicate the initial charging quantities (kg) of the vinyl cyanide compound and the aromatic vinyl compound used at the first step; $\eta$ designates yield of the copolymer with the total quantity of the monomeric compound as a referene; and Xan refers to the content of the vinyl cyanide compound to be present in the resulting copolymer.

In the following, explanations will be given as to the method of elevating the temperature in the reaction system after commencement of the polymerization reaction. The time $t_0$ used in the above-mentioned equation (I) should preferably have a value obtained by adding 5 to 100 minutes to the continuous feeding time period (in minute) of the aromatic vinyl compound; more preferably, it may be set at about 1.1 times or so as long as the continuous feeding time of the aromatic vinyl compound. FIG. 2 shows, as an example, relationship between the elapsed time after commencement of the copolymerization reaction and the temperature corresponding to the elapsed time, in the case of $t_0$ being 300 (min.) and the polymerization initiator used being 1-t-butyl-azo-1-cyanocyclohexane.

The graphical representation in FIG. 2 was obtained by plotting a relationship between t and $\theta$ by first setting the value of $t_0$ at 300, then calculating the decomposition half-life T corresponding to the elapsed time t, and finding out a temperature $\theta$ (°C.) corresponding to the decomposition half-life T by use of the rectilinear line Ⓐ (for 1-t-butyl-azo-1-cyanocyclohexane) in the decomposition half-life versus temperature diagram of FIG. 1. In the same procedure, the relationship between t and $\theta$ can be found out from the temperature $t_0$ to be set and the decomposition half-life versus temperature diagram of the polymerization initiator to be used. In the method of the present invention, the copolymerization reaction should be proceeded in maintenance of the relationship between t and $\theta$ thus found, in other word, while elevating the temperature of the reaction system along the temperature curve for the copolymerization reaction.

While it is most desirable in this third step to elevate the temperature of the reaction system in conformity to the temperature curve for the copolymerization reaction, it is preferable from the practical standpoint that variations in the temperature be controlled with a tolerance of $+5°$ C. from the temperature to be represented by this temperature curve for the copolymerization reaction, as a reference. When the temperature of the reaction system conspicuously fluctuates over this limit, transparency of the resulting copolymer is unfavorably impaired.

In the method of the present invention, the unreacted monomer is removed from the reaction system by stripping immediately after completion of the continuous feeding of the aromatic vinyl compound into the reaction system; thereafter, the polymeric compound thus produced is dehydrated, washed, and dried in accordance with the usual process, whereby high quality copolymer of vinyl cyanide compound and aromatic vinyl compound in bead form is obtained.

In the foregoing, the method of the present invention has been explained in detail. It should however be noted that there is no particular limitation to the production conditions other than the above-mentioned, i.e., a charging ratio between water and monomeric compound, selection of a suspension stabilizer, and selection of a molecular weight adjusting agent. The charging ratio between water and monomeric compound may be selected in a range of from 0.5/1 to 5/1 as in the ordinary case. For the suspension stabilizer, there may be exemplified inorganic compounds such as clay, talc, barium sulfate, barium phosphate, magnesium hydroxide, and so forth, or a combination of any of these and a very small amount of a surfactant; water-soluble polymers such as polyvinyl alcohol, polymethylvinyl ether, carboxymethyl cellulose, protein, polyacrylamide, acrylic acid type copolymers, and so on; and others. These known stabilizers may be arbitrarily selected for the purpose of the present invention. As the chain transfer agent, there may be exemplified t-dodecyl mercaptan, n-dodecyl mercaptan, and other alkyl mercaptans; α-methylstyrene dimer, terpinolene, and other terpenes. Appropriate selection may be made out of these known chain transfer agents for use.

Since the thus obtained vinyl cyanide compound-/aromatic vinyl compound copolymer according to the present invention is uniform in its composition, and contains therein the vinyl cyanide compound at a high ratio, it is highly excellent in its transparency, gas barrier property, chemical-resistance, and heat stability, in addition to its ordinary mechanical properties, hence the copolymer can be suitably employed in the manufacture of various molded articles, package containers, and so forth by the injection molding, the extrusion molding, the compression molding, the differential pressure molding, and so on.

As has been explained in detail in the foregoing, the present invention provides a method for producing the copolymer of vinyl cyanide compound and aromatic vinyl compound of very high quality having uniform composition and containing therein the vinyl cyanide compound at a high ratio, the production method of which successfully solves those disadvantages inherent in the conventional technique and exhibits remarkable effects to be mentioned in the following, hence its industrial utility is very high.

(1) The method of the present invention does not require any complicated reaction controls such as measurement of the reaction heat, stepwise setting of the reaction temperature for every conversion, and so forth, hence no variation occurs in the product quality due to errors in the heat measurement and the temperature setting.

(2) The method of the present invention carries out the reaction operations on the basis of the compositinal ratio of the monomer compounds for the predetermined initial charging as well as the predetermined temperature curve for the copolymerization reaction, hence the reaction operations can be easily done and the quality of the resulting product polymer is highly stable.

(3) The method of the present invention carries out the polymerization reaction at a high temperature, hence a difference in temperature between the polymerization temperature and the cooling medium can be taken sufficiently, which enables the heat of reaction to be easily and efficiently removed with such ordinary and widely available cooling medium as water.

(4) According to the method of the present invention, since the temperature at the end of the copolymerization reaction becomes very close to the temperature for the stripping process, the temperature elevation time for the stripping process, i.e., the waiting time for the temperature elevation can be made very short, which contributes to the high production efficiency.

(5) The method of the present invention provides the copolymer of vinyl cyanide compound and aromatic vinyl compound having very high content of the vinyl cyanide compound of from 50 to 85% by weight, uniform composition, and excellent transparency; moreover, the resulting copolymer has excellent gas barrier property and chemical resistant property, hence its utility as the molding material for various molded articles required to have such various properties is very high.

In the following, the present invention will be described in more detail with reference to specific examples of carrying out the method of the present invention. It should however be noted that the present invention will not be limited to these examples alone, but any changes and modifications may be made to the ingredients used and the conditions for the copolymerization reaction, so far as they do not depart from the spirit and scope of the invention as recited in the appended claims.

EXAMPLE 1

The initial charging of the following ingredients was done into a stainless steel autoclave of 30-liter capacity, covered with a jacket and provided with a baffle and a curved turbine type agitation blades. Following the charging, the ingredients were sufficiently agitated to render the reaction system uniform.

| | |
|---|---|
| Acrylonitrile | 7.0 kg |
| Styrene | 0.3 kg |
| Terpinolene | 60 g |
| Di-t-butyl paracresol | 2 g |
| Water | 7.0 kg |
| Copolymer of acrylic acid and octyl acrylate | 3 g |
| Sodium sulfate | 40 g |

Subsequently, pressure-charging and purging of nitrogen was repeated for several times to replace the interior air of the autoclave with nitrogen, after which the temperature of the reaction system was elevated to 106° C., and then, while agitating the reaction system, 15 g of 1-t-butyl-azo-1-cyanocyclohexane dissolved in a small amount of styrene was added to the reaction system by pressure-charging with use of nitrogen, to thereby initiate the copolymerization reaction.

Immediately thereafter, a styrene feeding port of a styrene feeding bomb, which was separately provided on the top side of the autoclave, was opened to start the continuous feeding of styrene into the reaction system. The feeding operation was continued for 4.5 hours at a constant rate of 0.6 kg/hr to thereby feed 2.7 kg styrene. During this continuous feeding, the reaction temperature was elevated along the temperature curve for the copolymerization reaction shown in FIG. 2 from 106° C. at the initiation of the polymerization reaction ($t=0$) to 128° C.

Upon termination of the continuous feeding of styrene into the reaction system, unreacted monomer was immediately removed from the reaction system by the stripping process, while elevating the temperature to 145° C. in 45 minutes, at which temperature the stripping was done for one hour. Thereafter, the reaction system was cooled, separated, washed, and dried in accordance with the ordinary method, thereby obtaining 8.7 kg of the copolymer in the bead form.

The content of acrylonitrile in the thus obtained copolymer was 66% by weight. From this copolymer in bead form, test pieces were prepared, and measured for its haze value as the yardstick for transparency of the resin on the basis of Japanese Industrial Standard (JIS) K7105, the result being 3%. This measured value was well comparable with the haze of the copolymer of acrylonitrile and styrene containing acrylonitrile in a range of from 25 to 30% by weight. Thus, there could be obtained a "high-nitrile/styrene type resin" excellent in its transparency.

EXAMPLE 2

The following ingredients were initially charged into the same autoclave as used in Example 1 above, and the copolymerization reaction was commenced in the same procedures and under the same conditions.

| | |
|---|---|
| Acrylonitrile | 6.0 kg |
| Styrene | 0.49 kg |
| Terpinolene | 60 g |
| Di-t-butyl paracresol | 2 g |
| Water | 7.0 kg |
| Copolymer of acrylic acid and octyl acrylate | 3 g |
| Sodium sulfate | 40 g |

Thereafter, the copolymerization reaction, the stripping of the unreacted monomer, separation, washing, and drying were carried out in the same procedure and under the same conditions as in Example 1 above with the exception that the continuous feeding rate of styrene was changed to 0.78 kg/hr, thereby obtaining 8.7 kg of the copolymer in bead form.

The content of acrylonitrile in the thus obtained copolymer was 55% by weight. When this copolymer was subjected to measurement of the haze value based on the method as described in Example 1 above, it was found to be 2.5%, which indicated that it had favorable transparency.

COMPARATIVE EXAMPLE 1

Into the same autoclave as used in Example 1 above, the initial charging of the same ingredients as in the same Example was done. Subsequently, the interior air of the autoclave was substituted with nitrogen in the same manner as done in Example 1 above. After the temperature of the reaction system was elevated to 115° C., 15 g of 1-t-butyl-azo-1-cyanocyclohexane was added in the same manner as in Example 1 to initiate the copolymerization reaction. Immediately after initiation of the copolymerization reaction, styrene was supplied to the reaction system in the same manner as in Example 1, i.e., at the constant rate of 0.6 kg/hr for 4.5 hours, with the exception that the temperature during this reaction was maintained at a constant level of 115° C. Subsequently while stripping the unreacted monomer, the temperature was raised to 145° C. in 75 minutes, at which temperature the stripping was continued for one hour. After this, the post-treatment was done in the same procedures as in Example 1, whereby 8.5 kg of copolymer in bead form was obtained.

The content of acrylonitrile in the resulted copolymer was 65% by weight. The haze value of this copolymer as measured in accordance with the method as described in Example 1 above was 17%, hence the copolymer as obtained was poor in its transparency.

From the above-mentioned Examples of the present invention and the Comparative Example, it will become evident that, while the method of the present invention produces the copolymer of acrylonitrile and styrene having excellent transparency, hence uniform composition, the method not meeting the requirements of the present invention produces only such copolymer of acrylonitrile and styrene having poor transparency, hence non-uniform composition.

What is claimed is:

1. A method for producing by suspension polymerization a copolymer comprising a residue of a vinyl cyanide compound selected form the group consisting of acrylonitrile, methacrylonitrile and mixtures thereof, and a residue of an aromatic vinyl compound selected from the group consisting of styrene, α-methyl styrene, paramethylstyrene, t-butylstyrene, styrene halide and mixtures thereof, having a substantially uniform composition and a content of the vinyl cyanide residue in a range of from 50 to 85% by weight, said method comprising (a) as a first step charging the total quantity of said vinyl cyanide compound and a partial quantity of said aromatic vinyl compound at a compositional ratio wherein the content of the polymerized residue of vinyl cyanide compound in the resulting copolymer attains an intended content within a range of from 50 to 85% by weight;

(b) as a second step initiating the copolymerization reaction by adding an azo-type polymerization initiator having a decomposition half-life at 95° C. of two hours or longer to the compounds charged in said first step after said compounds are elevated to a temperature corresponding to a decomposition half-life T of the polymerization initiator represented by the following equation (I) and calculated as t=0:

$$T = \frac{\log 2}{\log\left(\frac{t_0 - t}{t_0 - t - 1}\right)} \quad (I)$$

where: t denotes an elapsed time (in minute) after initiation of the copolymerization reaction as counted from the instant after the polymerization initiator is added to the reaction system and continuous feeding of the aromatic vinyl compound is commenced, as the starting point; $t_0$ represents an arbitrary time (in minute) which is longer by two minutes or more than the time for the continuous feeding of the aromatic vinyl compound; and T is the decomposition half-life (in minute) of the polymerization initiator; and (c) as a third step carrying out the copolymerization reaction, while immediately and continuously feeding the remainder of the aromatic vinyl compound to the reaction system after commencement of the copolymerization reaction, and elevating the temperature of the reaction system along a temperature ($\theta$) corresponding to the decomposition half-life T of the polymerization initiator represented by the said equation (I), the quantity of aromatic vinyl compound fed in the third step being determined by the following formula (II):

$$Wsa = \frac{\eta(1 - Xan)}{1 - \eta(1 - Xan)} Wan - Wsi \quad (II)$$

where: Wsa denotes the total quantity (kg) of the aromatic vinyl compound to be continuously fed in the third step; Wan and Wsi respectively indicate the initial charging quantities (kg) of the vinyl cyanide compound and the aromatic vinyl compound used in the first step; $\eta$ designates the yield of the copolymer with the total quantity of the monomeric compound as a reference; and Xan is the content of the vinyl cyanide compound present in the resulting copolymer.

2. The method according to claim 1, wherein the vinyl cyanide compound is acrylonitrile and the aromatic vinyl compound is styrene.

* * * * *